United States Patent
Fischer et al.

(10) Patent No.: US 7,536,427 B2
(45) Date of Patent: May 19, 2009

(54) COMPARING PROCESS SIZES

(75) Inventors: Uwe Fischer, Karlsruhe (DE); Daniela Heep, Waldbrunn (DE); Klaus Stadlthanner, Speyer (DE)

(73) Assignee: SAP AG, Walldorf (DE)

( * ) Notice: Subject to any disclaimer, the term of this patent is extended or adjusted under 35 U.S.C. 154(b) by 262 days.

(21) Appl. No.: 11/157,150

(22) Filed: Jun. 20, 2005

(65) Prior Publication Data
US 2006/0064439 A1    Mar. 23, 2006

(30) Foreign Application Priority Data
Sep. 20, 2004    (EP) ................... 04022302

(51) Int. Cl.
*G06F 17/30* (2006.01)
*G06F 15/16* (2006.01)

(52) U.S. Cl. ............... 707/205; 707/10; 707/100; 707/200; 700/97; 700/99; 705/8

(58) Field of Classification Search ............... None
See application file for complete search history.

(56) References Cited

U.S. PATENT DOCUMENTS

| | | | |
|---|---|---|---|
| 5,295,065 A * | 3/1994 | Chapman et al. | 700/99 |
| 6,198,980 B1 * | 3/2001 | Costanza | 700/99 |
| 6,571,215 B1 * | 5/2003 | Mahapatro | 705/8 |
| 2002/0166017 A1 * | 11/2002 | Kim et al. | 710/240 |
| 2004/0187140 A1 * | 9/2004 | Aigner et al. | 719/328 |

OTHER PUBLICATIONS

Junwei Hou and Wayne Wolf, "Process Partitioning for Distributed Embedded Systems", Mar. 1996, Proceedings of the 4th International Workshop on Hardware/Software Co-Design (Codes/CASHE '96), pp. 70-76.*

* cited by examiner

*Primary Examiner*—Tony Mahmoudi
*Assistant Examiner*—Michele C Choi
(74) *Attorney, Agent, or Firm*—Schwegman, Lundberg & Woessner, P.A.

(57) ABSTRACT

A system to compare process sizes is described. In one example embodiment, the system comprises memory and one or more processing devices. The memory may be configured to store executable instructions. The one or more processing devices may be configured to execute the instructions. The instructions may cause the one or more processing devices to generate a first process that corresponds to an activity, generate data objects that correspond to the elements associated with the activity, and identify a number of data objects associated with the first process. The one or more processing devices may further obtain a reference size for the first process based on the number of data objects and compare the reference size for the first process with the reference size for another process.

19 Claims, 6 Drawing Sheets

COMPARING PROCESS SIZES

CLAIM TO PRIORITY

This patent application claims priority to European Patent Application No. EP04022302.6, filed on Sep. 20, 2004, the contents of which are hereby incorporated by reference into this patent application as if set forth herein in full.

TECHNICAL FIELD

This patent application relates generally to processing performed by a digital computer and, more particularly, to comparing processes based, e.g., on their sizes.

BACKGROUND

Real-world activities can be simulated as computer processes. Such simulations are often used in the manufacturing field; however, they may also be used in other production-related activities and in post-production, such as sales and marketing.

A drawback of current simulation systems is their inability to compare similar processes in terms of importance. This is particularly true if the processes are different. For instance, comparing a sales process (or portion thereof) having only few objects and a low granularity with a manufacturing process (or portion thereof) having a large number of objects and a high granularity can often result in the incorrect conclusion that the manufacturing activity is more important than the sales activity. Comparing objects associated with those processes is further complicated if their simulations can change.

Because computer-simulated processes can include a variety of different, but linked, tasks, it can become increasingly difficult to determine sizes of such processes. This can hinder comparison of the processes, at least in terms of their sizes.

SUMMARY

This patent application features methods, systems, and apparatus, including computer program products, for use in comparing processes. Aspects of the methods, systems, and apparatus are set forth below.

An example method and system are described that examine a real-world activity, examine a computer-based process that corresponds to the activity and its components, and generate data objects that correspond to the elements from the real-world activity. In one embodiment, the method may determine whether a merger or a split occurs in the process, or whether a comparison is requested. A merger occurs when data objects are combined in a single task and a split occurs when data objects in a single task are assigned to one or more different tasks. Both a merger and a split can affect the reference size of the process if the merger or split occurs with respect to an external process, as explained in more detail below. If a split has occurred that involves an external process (e.g., objects are moved to the external process), the method may obtain the new reference size of the original process. The new reference size, N1, after a split can be calculated as follows $$N_1 = N_0 \frac{n_c(S)}{n_C(S) + n_s},$$

where $N_1$ is the new reference size, $n_C(S)$ is a number of data objects in a task S after the split from the first process, and $n_s$ is a number of data objects split into the different process. If a merger has occurred that involves an external process (e.g., objects are imported from the external process), the method obtains the new reference size. The new reference size, N2, after the merger can be calculated as follows $$N_2 = N_0 \left[ 1 + \frac{n_M}{n_G(M)} \right],$$

where N2 is the new reference size, nG(M) is a number of data objects in first process M before merging, and nM is a number of data objects that are merged into the first process. If a comparison is requested, the method compares a current reference size of the process to a reference size of another process.

The details of one or more examples are set forth in the accompanying drawings and the description below. Further features, aspects, and advantages of the invention will become apparent from the description, the drawings, and the claims.

DESCRIPTION OF THE DRAWINGS

Like reference numerals in different figures denote like elements.

DETAILED DESCRIPTION

Using current enterprise resource planning (ERP) systems, activities in the real-world can be simulated as computer-based processes. For example, an aspect of a management, development, or production project can be simulated, as can interactions between aspects of those projects. Similarly, aspects of a product lifecycle can be simulated via a product lifecycle management (PLM) process. Elements used in a real-world activity can be mapped to data objects for use with its counterpart computer-based process. For example, a PLM process can use data objects (e.g., business objects) to represent real-world elements and products. Such objects can change during the process.

A computer-based simulation process (hereinafter, simply "process") can include a sequence of tasks. A process with more than one task can also be referred to as a chain or configuration. A process can be split into independent branches, each containing separate tasks. Likewise, two processes can be combined to form a single process.

The tasks of a process are typically organized in a logical sequence that corresponds to functional dependencies of the process' counterpart real-world activity. In one example, a task can be a self-contained functional unit that corresponds to a clearly defined action, and an element can be an assembly including various parts, each of which also may constitute an element in its own right. The granularity of elements, in this context, is the number of elements referenced in a larger element. For example, a computer can be an element. The computer may contain a processor, a hard-disk, a memory, motherboards, a graphics-unit, etc. Each of these also may constitute an element. The computer element thus has several other elements as its components. The more elements that are within a target element, the higher the target element's granularity.

As noted above, elements of an activity can be mapped to data objects. The data objects can be linked to each other to indicate relationships between elements. The granularity of a data object corresponds to the amount that the data object references other data objects (and hence corresponds to the granularity of its corresponding element). During a process, granularities of objects may be defined differently, e.g., within one process task or between process tasks. For example, in a production process, a computer may be described by a data object that references the computer's components. Therefore, in the production process, the computer data object may have a relatively high granularity. By contrast, in a sales process, the computer data object may not reference other data objects. This is because such references are not important, or less important, to sales. Thus, in the sales process, the computer data object may have a relatively low granularity.

Figure 1:
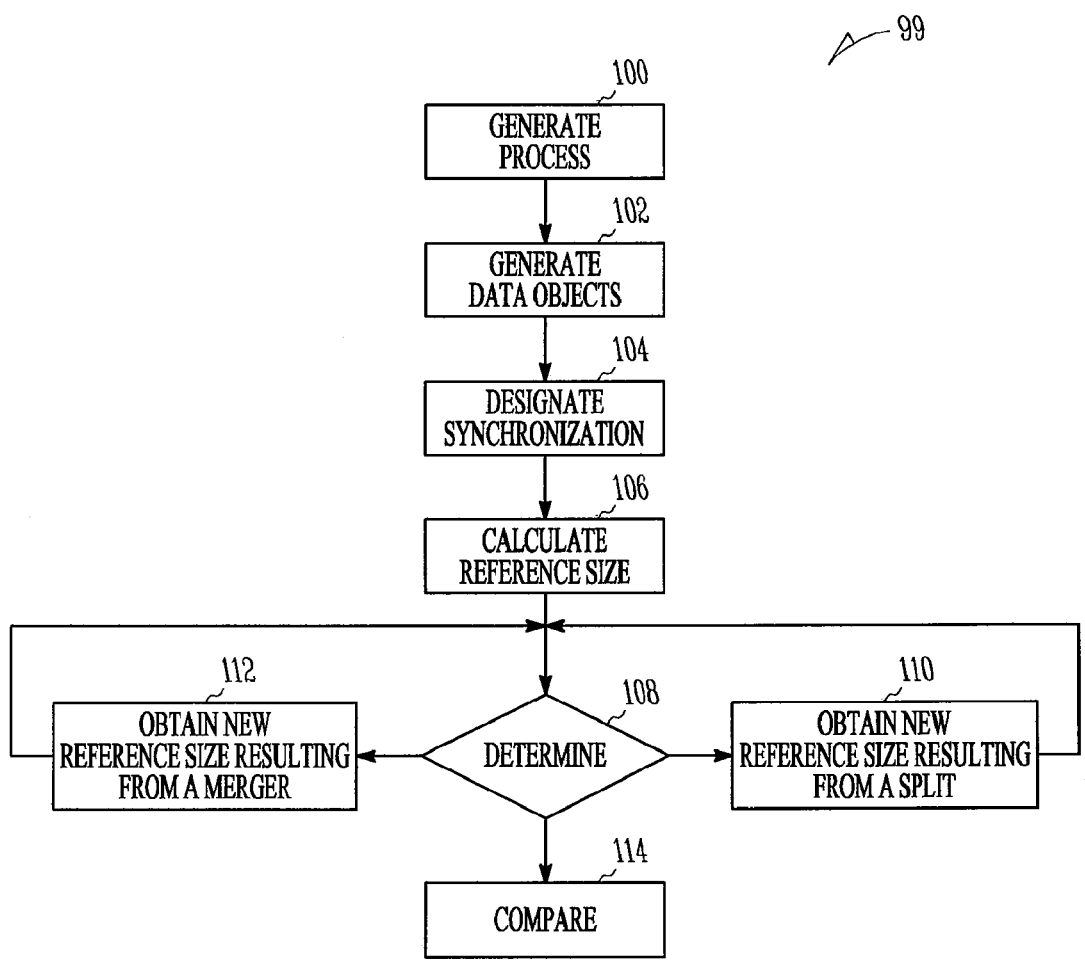
FIG. 1 is a flowchart of a method for determining a reference size of a process.
Figure 2:
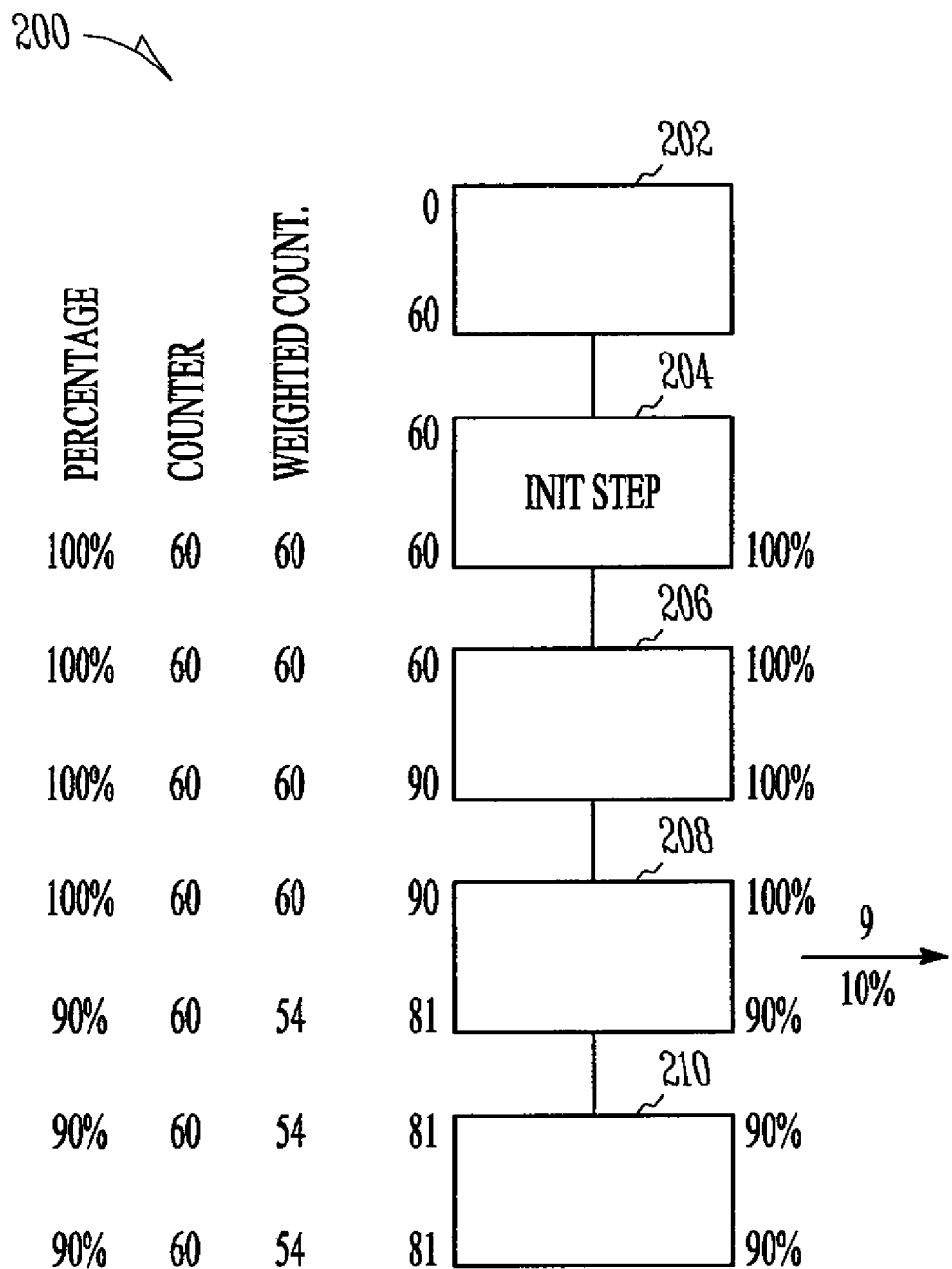
FIGS. 2 to 4 are flowcharts showing examples of processes that have reference sizes determined in accordance with FIG. 1.
Figure 3:
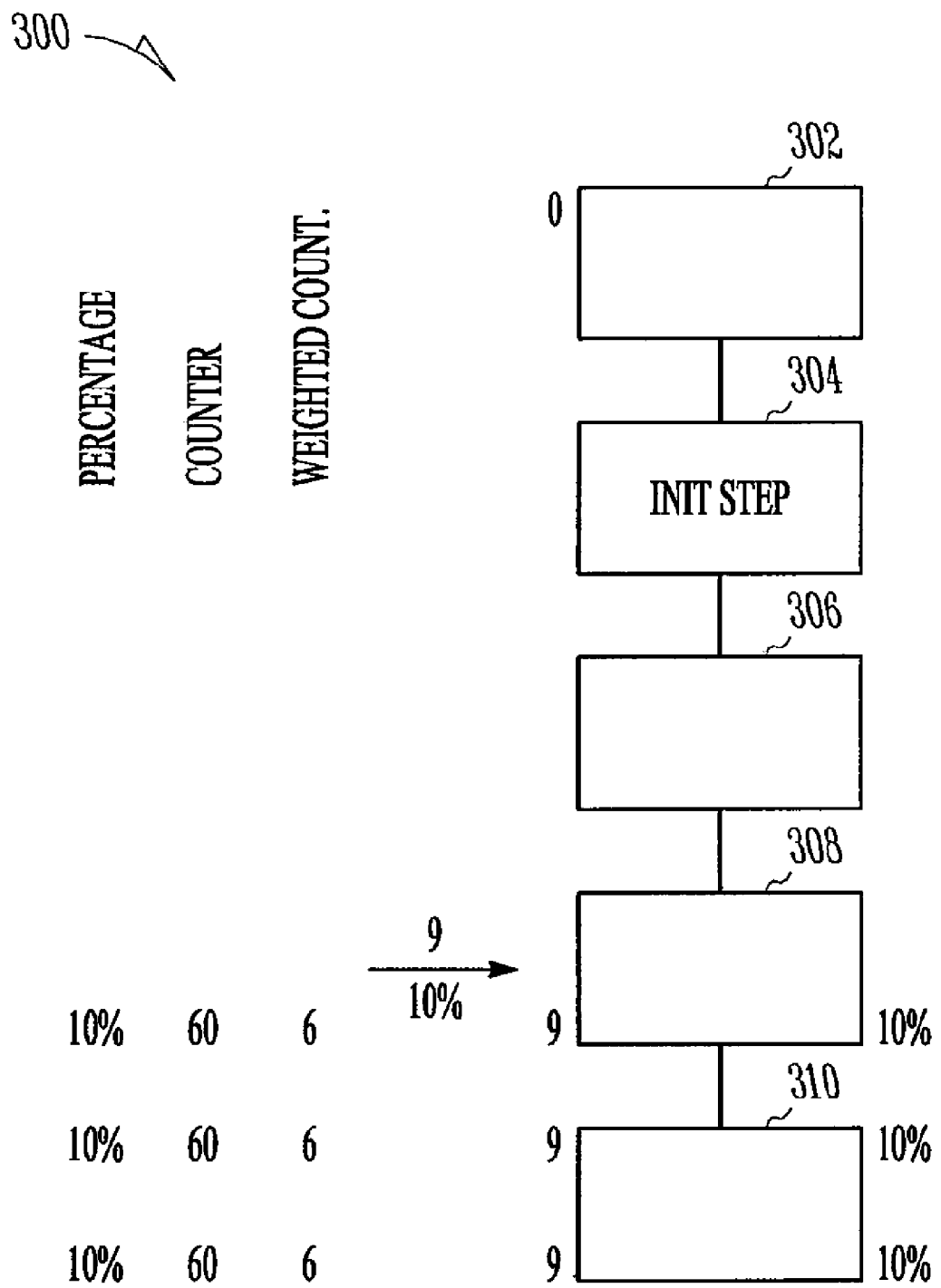
Figure 4:
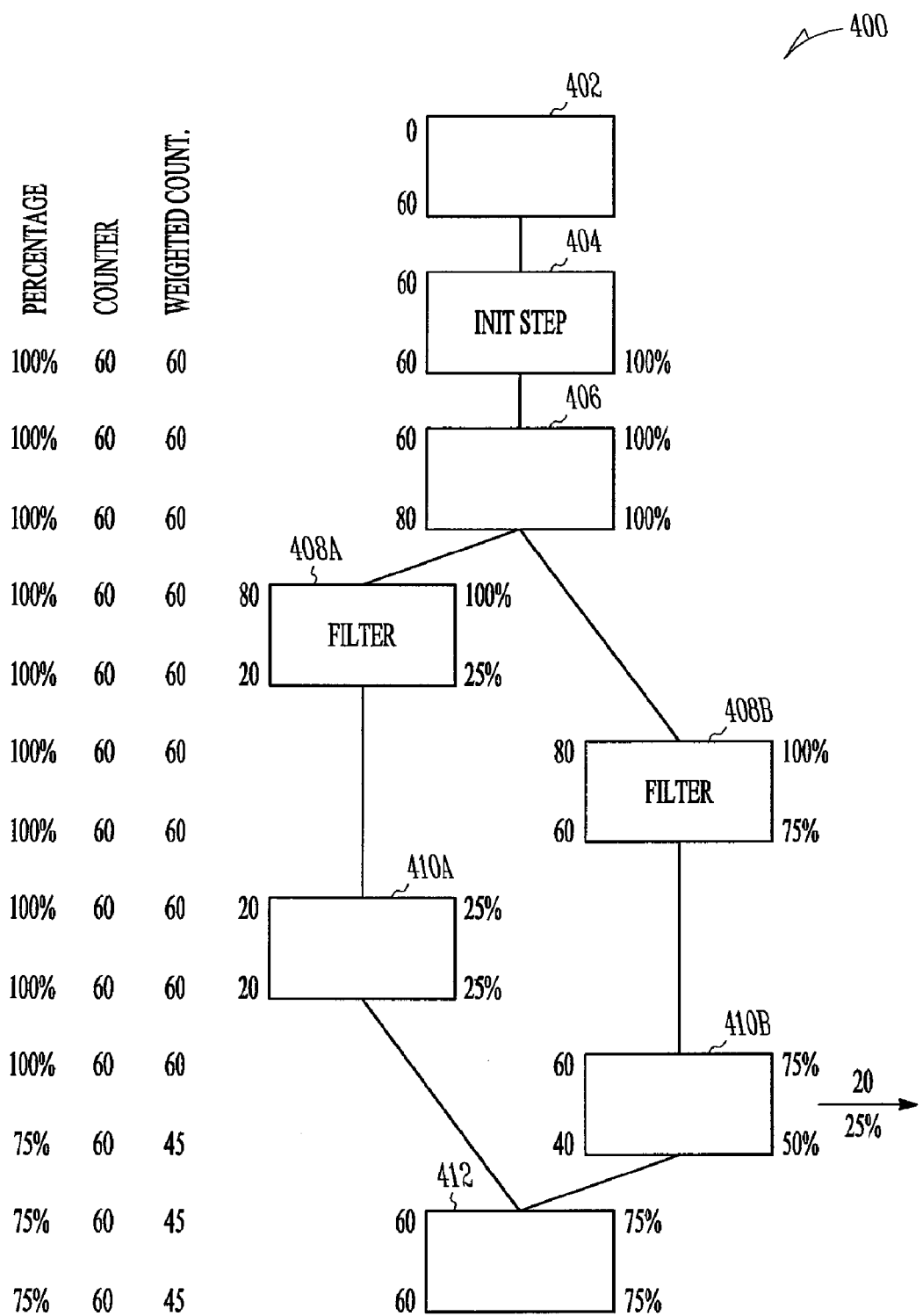

Referring to FIG. 1, method 99 examines a real-world activity, and components thereof, and generates (100) a computer-based process that corresponds to the activity and its components. The components of the activity may include elementary activities that make up the overall activity. Tasks of the process may relate to any aspect of the real-world activity, such as transforming elements. In this context, an element may be any element relating to the activity upon which a comparison is to be based, such as materials required for manufacturing, man-hours estimates for completing the activity, and the like. FIGS. 2 to 4 show examples of tasks that are generated by method 99. Method 99 also generates (102) data objects that correspond to the elements from the real-world activity.

Method 99 designates (104) a task in the simulation process as a synchronization task. The synchronization task essentially dictates factors upon which process comparisons are based. In FIGS. 2 to 4, synchronization tasks are labeled 204, 304 and 404. In a synchronization task, data objects in the process are identified and counted (106). Based on the number of data objects, process 99 calculates (106) a reference size for the process. In this example, an initial reference size, $N_o$, is obtained as follows $$N_0 = \Sigma n_C(X),$$

where $n_C$ is the number of data objects in a target task "X" of the process.

Method 99 determines (108) whether a merger or a split occurs in the process, or whether a comparison is requested. A merger occurs when data objects are combined in a single task and a split occurs when data objects in a single task are assigned to one or more different tasks. Both a merger and a split can affect the reference size of the process if the merger or split occurs with respect to an external process, as explained in more detail below. A comparison compares information determined in method 99 for two processes.

If a split has occurred that involves an external process (e.g., objects are moved to the external process), method 99 obtains (110) the new reference size of the original process. The new reference size, $N_1$, after a split can be calculated as follows $$N_1 = N_0 \frac{n_C(S)}{n_C(S) + n_s},$$

where $n_C(S)$ is the number of data objects in an original process S after the split, and $n_s$ is a number of data objects split into a new process.

If a merger has occurred that involves an external process (e.g., objects are imported from the external process), method 99 also obtains (112) the new reference size. The new reference size, $N_2$, after the merger can be calculated as follows $$N_2 = N_0 \left[ 1 + \frac{n_M}{n_G(M)} \right],$$

where $n_G(M)$ is the number of data objects in an original process M before merger, and $n_M$ is a number of data objects that are merged into the process.

If a comparison is requested, method 99 compares (114) a current reference size of the process to a reference size of another process. A process comparison may also take other factors into account. For instance, a product development activity can depend on man-hours required, cost, information technology resources required, and time of development, to name a few factors. Comparing processes may include selecting characteristics by which the processes are to be compared, and performing the comparison.

FIG. 2 shows an exemplary process 200, which may be used to illustrate method 99. Process 200 begins with task 202. In the beginning of process 200, no objects are used. This is evidenced by the upper number "0" at the left side of task 202.

As noted above, process 200 may be compared to one or more other processes. To facilitate comparison, task 202 maps sixty elements into sixty data objects. These sixty data objects may represent, e.g., sixty different materials required for manufacturing a machine, sixty man-hours estimated to complete a project, or the like. Task 202 thus ends with sixty data objects, as evidenced by the lower number "60" at the left side of task 202.

Here, task 204 is the synchronization task. Task 204 determines the number of objects and stores the resulting value in a counter. The counter may be implemented in software and/or hardware. The number of objects determined in task 204 is used to calculate the reference size of process 200. The number of objects determined in task 204 is also deemed to be 100% of the objects in process 200. During task 204, the number of objects in process 200 is unchanged. This is evident from the upper and lower numbers "60" next to task 204, i.e., there is no change in that number during task 204.

Following task 204, process 200 is ready to be compared to one or more other processes. In this implementation, all processes to be compared are subjected to synchronization; however, in other embodiments, that may not be the case.

To enable comparison of processes having objects whose granularity changes over time, granularity changes are disregarded when calculating reference sizes. For example, during task 206, the granularity of the objects may change. This may cause the number of objects to increase from sixty to ninety. However, the reference size and the object percentage are not changed. This is because no objects actually exit or enter process 200. The same holds true for objects that are combined, e.g., into assemblies. For example, in task 204, various objects may be aggregated into an assembly. The number of objects referred to in task 206 may thus change. However, the size of process 200 does not change, since the overall number of objects in process 200 has not changed.

If, at any point in process 200 after the reference size has been determined, objects are added to the process (e.g., by merger) or removed from the process (e.g., by split), the reference size is increased or decreased. The increase or decrease is measured in terms of percentage. For example, if added objects correspond to 25% of the total number of objects, the reference size is increased by 25%. Conversely, if removed objects make up 25% of the total number of objects, the reference size is decreased by 25%. A weighted counter may be used to represent the reference size of a process. This weighted counter is set to a predetermined value after the synchronization task. The weighted counter does not change unless objects are split from process 200 or merged into process 200.

By way of example, task 208 may cause a split in process 200. Eighty-one objects remain in original process 200, and nine objects are passed to a successor process 300 (FIG. 3). Passing the nine objects to successor process 300 results in transfer of 10% of the total number of ninety objects from process 200 to process 300. The reference size of process 200 is changed because of this split. The split can be based on the corresponding real-world activity, or can represent a simulation associated with the activity. In any case, after the split, the percentage of objects in process 200 is 90%, because 10% of the objects are transferred to process 300. The weighted counter of process 200 is reduced by 10%, resulting in a reference size of fifty-four, which corresponds to a weighted normalized number of objects. Task 210 treats (i.e., processes) the remaining fifty-four objects.

FIG. 3 illustrates process 300. Process 300 includes tasks 302 to 310. Here, task 304 is the synchronization task. Task 304 obtains the reference size of process 300 in the same manner as task 204 above. In task 308, objects that were split from process 200 merge into process 300. This merger causes the reference size of process 300 to increase, since the number of objects in process 300 increases. Task 308 therefore obtains a new reference size. The weighted counter of process 200 is reduced by six, resulting in increasing the weighted counter of process 300 by six, which augments the reference size of process 300. Process 300 continues in task 310 with a new reference size of six.

Processes 200, 300 might be different. For example, process 300 processes only about 10% of the volume of the process 200. However, their weighted and normalized reference sizes can be compared at any time.

FIG. 4 illustrates a process 400 having splits and mergers. The process 400 commences at operation 402. Parallel tasks 408*a*, 408*b* and 410*a*, 410*b* are part of process 400. Thus, the reference size of process 400 does not change. In process 400, each task stores the percentage of objects that it processes. This value can only be changed by a split or merger with a separate process (as noted above), or by filtering. However, filtering does not affect the reference size of process 400.

Task 404 determines the reference size of process 400. In this case, the number of objects is sixty. Thus, the weighted counter for process 400 is set at sixty, and the percentage of objects deemed to be 100%. The values for the percentage and weighted counter can be copied from values of a previous task. This results in task 406 having the same values as task 404. In task 406, the number of referenced objects is increased from sixty to eighty. However, no objects are removed from, or added to, process 400. This increase, therefore, does not affect the reference size of process 400. Thus, the percentage and weighted counter are also not affected by the increase Process 400 splits into two branches following task 406. In a real-world context, this occurs, e.g., if an activity includes two separate activities. For example, a machine can be partially manufactured by two independent robots. If both robots are available, the activity can be split, and each robot works in parallel to manufacture the machine. The reference size of process 400, however, remains unchanged as a result of the split.

After splitting in task 406, task 408*a* starts with eighty objects, which constitute 100% of objects in the left branch. In task 408*a*, sixty objects are filtered out. The percentage of objects in the left branch is thus reduced to 25%, because 75% of objects are filtered out. This reduction only affects the left branch, and does not affect the reference size of process 400. That is, the reference size is not changed in task 410*a*.

Referring now to the right branch, after the splitting, task 408*b* starts with eighty objects and filters out twenty objects, resulting in 75% of the remaining objects in this branch. Again, filtering does not affect the reference size of process 400.

In case a split with another process, such as process 400, occurs with parallel branches, the task that initiates the split needs to know the percentage of objects that are processed in its branch to determine the percentage of objects that is passed to the other process. For example, during task 410*a*, a split with another process is triggered. In this split, twenty objects are passed to another process (not shown). Task 410*a* still processes 75% of the eighty objects from the beginning of the right branch. Splitting twenty objects to another process results in a reduction of 25% of objects in the right branch. The reduction of 25% results in a reduction of the reference size of process 400 by 25%, and a reduction of the weighted counter from sixty to forty-five. Process 400 can now be regarded as less important, since its reference size is reduced. A practical example of this is as follows. During product development that is simulated by a process, some technicians may be removed from the project and assigned to a different project. This reduction in manpower can result in a reduced importance of the project.

Tasks 410*a* and 410*b* are merged into task 412. The merging does not affect the reference size of process 400, however. Task 412 adds number of objects from previous tasks, and stores the resulting sum and percentage values from previous tasks.

Figure 5:
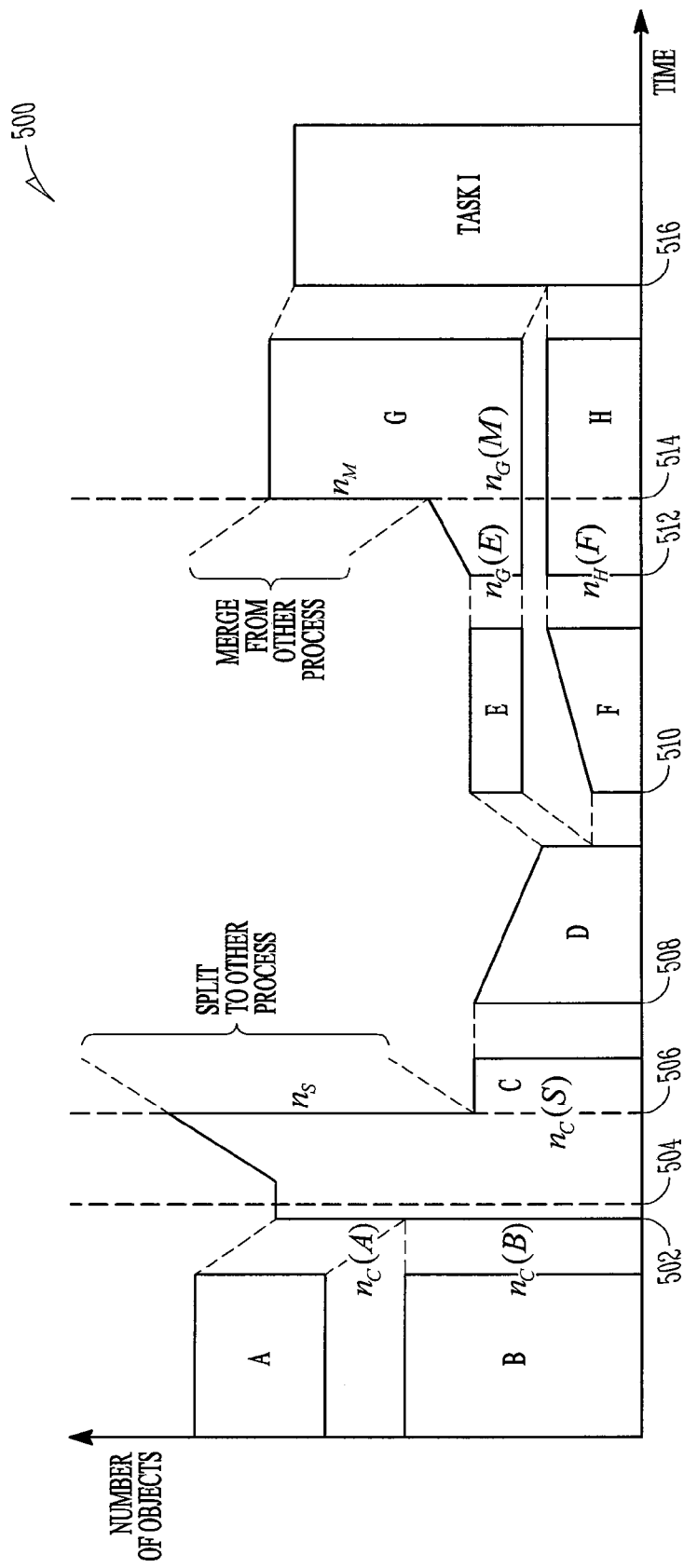
FIG. 5 is a chart showing a number of data objects in a process over time.

FIG. 5 is a chart 500 showing changes to objects in a process over time. At its beginning, the process of FIG. 5 includes two tasks: A and B. Tasks A and B can operate in parallel, as in the left and right branches of FIG. 4. Task A includes $n_c(A)$ objects and task B includes $n_c(B)$ objects. At time 502, the two tasks are merged, resulting in a new task C. Task C can be a synchronization task. Calculation of the reference size is illustrated and explained in conjunction with FIG. 6. Synchronization can take place at time 504.

After synchronization, the number of objects in task C increases. Task C is subjected to a split at time 506. Some objects are split from task C into a new process. The reference size of process 500 is thus reduced. The remaining number of objects of task C after the split is $n_c(S)$. Task C changes into task D at time 508, which change may result from any factor. In task D, the number of objects is reduced, e.g., by filtering, however, the reference size of the process remains constant. The reduction in the number of objects can be caused by an assembly process in task D, in which the granularity of the objects is decreased. However, the reference size of process 500 does not change.

After task D, at time 510, the process splits into two tasks. The objects of task D are split into two new tasks E and F. The number of objects in task F is increased. However, the reference size of process 500 does not change. The number of objects provided from task E to task G at time 512 is $n_G(E)$. The number of objects provided from task F to task H at time 512 is $n_H(F)$. In task G, at time 514, there is a merger with a different process (not shown). During this merger, objects are copied from the different process into task G. The reference size of process 500 is thus increased at time 514, as described below with respect to FIG. 6. The number of objects from the merging process is $n_M$ and the number of objects in task G at time 514 is $n_G(M)$. Tasks G, and H are merged into one single task 1 at time 516. The reference size of process 500, however, does not change as a result.

Figure 6:
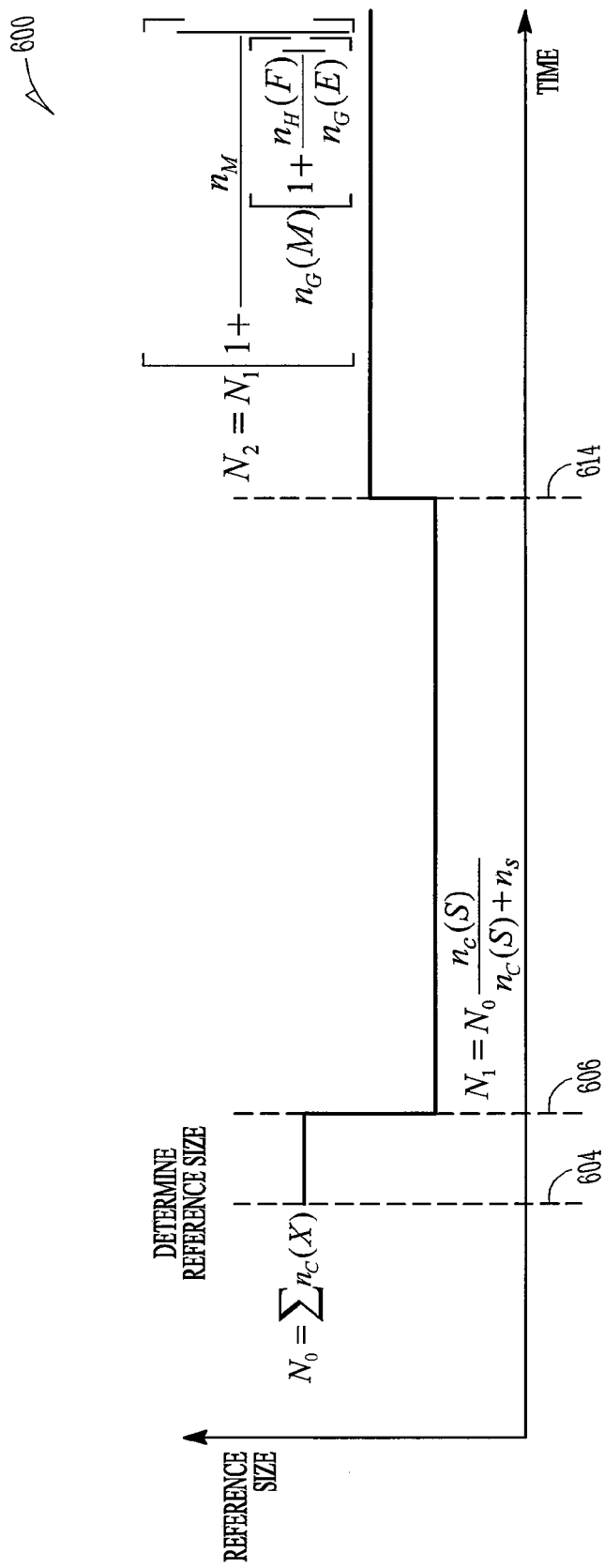
FIG. 6 is a chart showing determining a reference size for the process of FIG. 5.

FIG. 6 shows a chart 600 indicating a change to the reference size of process 500 (FIG. 5). The time axis is the same as that shown in FIG. 5. At time 604, a synchronization task determines the reference size. The reference size is calculated as follows $$N_0 = \Sigma n_C(X),$$

which is the sum over all objects at time 604 in task C.

At time 606, a split with another process occurs. The reference size of process 500 is reduced because objects are removed from process 500. The new reference size, $N_1$, is determined as follows $$N_2 = N_0 \frac{n_c(S)}{n_C(S) + n_s},$$

where $N_0$ is the initial reference size, $n_c(S)$ is the number of objects n in task C after the split, and $n_s$ is the number of objects split to the other process.

During further processing, the reference size remains unchanged. At time 614 however, a merger with another process occurs. The reference size is increased as follows $$N_2 = N_1 \left[ 1 + \frac{n_M}{n_G(M)\left[1 + \frac{n_H(F)}{n_G(E)}\right]} \right],$$

where $N_2$ is the new reference size, $n_g(M)$ is the number of objects n in task G at a time of the merger, $n_H(F)$ is the number of objects n at the beginning of task H, $n_G(E)$ is the number of objects n at the beginning of task G, and $n_M$ is the number of objects n merged into task M. The inclusion of task G and H into task I does not affect the reference size because the merger occurs within process 500, not with an external process.

The foregoing information may be used to compare processes. As indicated above, during a comparison of first and second processes, the reference size of the first process may be compared to the reference size of the second process. The resulting comparison may indicate which process is more important, efficient, cheaper, easier to implement, or the like. Basically, the comparison may be indicative of any relative judgment that can be made for two (or more) processes. Process comparisons may also take other factors into account, e.g., by selecting characteristics of the processes to be compared, and augmenting the comparison using the selected characteristics. Any type of processes may be compared, including processes corresponding to similar and/or different real-world activities.

The methods described herein, or any portion(s) thereof—including implementing computer-based process simulations and comparisons thereof, are not limited to use with any particular hardware and software; they may find applicability in any computing or processing environment and with any type of machine that is capable of running machine-readable instructions. All or part of the methods can be implemented in digital electronic circuitry, or in computer hardware, firmware, software, or in combinations thereof.

All or part of the methods can be implemented as a computer program product, i.e., a computer program tangibly embodied in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps associated with the methods can be performed by one or more programmable processors executing one or more computer programs to perform the functions of the methods. The method steps can also be performed by, and the methods can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include a processor for executing instructions and one or more storage area devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

All or part of the methods can be implemented in a computing system that includes a back-end component, e.g., as a data server, or that includes a middleware component, e.g., an application server, or that includes a front-end component, e.g., a client computer having a graphical user interface, or any combination of such back-end, middleware, or front-end components. The components of the system can be interconnected by any form or medium of digital data communication, e.g., a communication network. Examples of communication networks include a LAN and a WAN, e.g., the Internet.

Method steps associated with the methods can be rearranged and/or one or more such steps can be omitted to achieve the same, or similar, results to those described herein. Elements of different embodiments described herein may be combined to form other embodiments not specifically set forth above. Other embodiments not specifically described herein are also within the scope of the following claims.

What is claimed is:

1. A computer-based method of comparing processes, the method comprising:

generating a first process that corresponds to an activity, the activity having associated elements and the first process comprising tasks;

generating data objects that correspond to the elements associated with the activity;

identifying a number of data objects associated with the first process;

obtaining a first reference size for the first process based on the number of data objects;

determining that a data object from the number of data objects associated with the first process is split from the first process into a different process;

calculating a new reference size as $$N_1 = N_0 \frac{n_c(S)}{n_C(S) + n_s},$$

where $N_1$ is the new reference size, $n_C(S)$ is a number of data objects in a task S after the split from the first process, and $n_s$ is a number of data objects split into the different process; and comparing the new reference size to a second reference size, the second reference size corresponding to a second process; and generating a result of the comparing.

2. The method of claim 1, wherein the tasks correspond to actions that are constituents of the activity.

3. The method of claim 1, wherein identifying is performed using a synchronization task, the synchronization task referencing all the data objects associated with the first process.

4. The method of claim 1, wherein identifying the number of data objects comprises counting the number of data objects.

5. The method of claim 1, wherein obtaining the first reference size comprises calculating $$N_0 = \Sigma n_C(X),$$

where $N_0$ is the first reference size, and $n_C$ is a number of data objects in a task X.

6. The method of claim 1, further comprising obtaining the new reference size for the first process when the data object is split from the first process into the different process.

7. The method of claim 1, further comprising obtaining the new reference size for the first process when the data object is merged into the first process from the different process.

8. The method of claim 1, further comprising obtaining the new reference size for the first process when the number of data objects in the first process changes; and wherein changes to data object granularity do not affect the new reference size.

9. A computer program product stored in a computer readable storage device, the computer program product comprising instructions that, when executed, cause at least one processor to perform operations comprising:

generating a first process that corresponds to an activity, the activity having associated elements and the first process comprising tasks;

generating data objects that correspond to the elements associated with the activity;

identifying a number of data objects associated with the first process;

obtaining a first reference size for the first process based on the number of data objects;

determining that a data object from the number of data objects associated with the first process is split from the first process into a different process;

calculating a new reference size as $$N_1 = N_0 \frac{n_c(S)}{n_C(S) + n_s},$$

where $N_1$ is the new reference size, $n_C(S)$ is a number of data objects in a task S after the split from the first process, and $n_s$ is a number of data objects split into the different process; and comparing the new reference size to a second reference size, the second reference size corresponding to a second process; and generating a result of the comparing.

10. The computer program product of claim 9, wherein the tasks correspond to activities that are constituents of the activity.

11. The computer program product of claim 9, wherein identifying is performed using a synchronization task, the synchronization task referencing all the data objects associated with the first process.

12. The computer program product of claim 9, wherein identifying the number of data objects comprises counting the number of data objects.

13. The computer program product of claim 9, wherein obtaining the first reference size comprises calculating $$N_0 = \Sigma n_C(X),$$

where $N_0$ is the first reference size, and $n_C$ is a number of data objects in a task X.

14. The computer program product of claim 9, wherein the operations further comprise obtaining the new reference size for the first process when the data object is split from the first process into the different process.

15. The computer program product of claim 9, wherein the operations further comprise obtaining the new reference size for the first process when the data object is merged into the first process from the different process.

16. A system comprising:

memory that stores executable instructions; and one or more processing devices that execute the instructions to:

generate a first process that corresponds to an activity, the activity having associated elements and the first process comprising tasks;

generate data objects that correspond to the elements associated with the activity;

identify a number of data objects associated with the first process;

obtain a first reference size for the first process based on the number of data objects;

determine that a data object from the number of data objects associated with the first process is split from the first process into a different process;

calculate a new reference size as $$N_1 = N_0 \frac{n_c(S)}{n_C(S) + n_s},$$

where $N_1$ is the new reference size, $n_C(S)$ is a number of data objects in a task S after the split from the first process, and ns is a number of data objects split into the different process; and compare the new reference size to a second reference size, the second reference size corresponding to a second process; and generate a result of the comparing.

17. A computer-based method of comparing processes, the method comprising:

generating a first process that corresponds to an activity, the activity having associated elements and the first process comprising tasks;

generating data objects that correspond to the elements associated with the activity;

identifying a number of data objects associated with the first process;

obtaining a first reference size for the first process based on the number of data objects;

determining that a data object from the number of data objects associated with the first process is merged into a different process;

calculating a new reference size as $$N_2 = N_0 \left[ 1 + \frac{n_M}{n_G(M)} \right],$$

where $N_2$ is the new reference size, $n_G(M)$ is a number of data objects in first process M before merging, and $n_M$ is a number of data objects that are merged into the first process; and comparing the new reference size to a second reference size, the second reference size corresponding to a second process; and generating a result of the comparing.

18. A computer program product stored in a computer readable storage device, the computer program product comprising instructions that, when executed, cause at least one processor to perform operations comprising:

generating a first process that corresponds to an activity, the activity having associated elements and the first process comprising tasks;

generating data objects that correspond to the elements associated with the activity;

identifying a number of data objects associated with the first process;

obtaining a first reference size for the first process based on the number of data objects;

determining that a data object from the number of data objects associated with the first process is merged into a different process;

calculating a new reference size as $$N_2 = N_0 \left[ 1 + \frac{n_M}{n_G(M)} \right],$$

where $N_2$ is the new reference size, $n_G(M)$ is a number of data objects in first process M before merging, and $n_M$ is a number of data objects that are merged into the first process; and comparing the new reference size to a second reference size, the second reference size corresponding to a second process; and generating a result of the comparing.

19. A system comprising:

memory that stores executable instructions; and one or more processing devices that execute the instructions to:

generate a first process that corresponds to an activity, the activity having associated elements and the first process comprising tasks;

generate data objects that correspond to the elements associated with the activity;

identify a number of data objects associated with the first process;

obtain a first reference size for the first process based on the number of data objects;

determine that a data object from the number of data objects associated with the first process is merged into a different process;

calculate a new reference size as $$N_2 = N_0 \left[ 1 + \frac{n_M}{n_G(M)} \right],$$

where $N_2$ is the new reference size, $n_G(M)$ is a number of data objects in first process M before merging, and $n_M$ is a number of data objects that are merged into the first process; and compare the new reference size to a second reference size, the second reference size corresponding to a second process; and generate a result of the comparing.

* * * * *